July 4, 1961
T. P. GOSLIN
2,990,937
SERVO CONTROL SYSTEMS
Filed Jan. 12, 1959
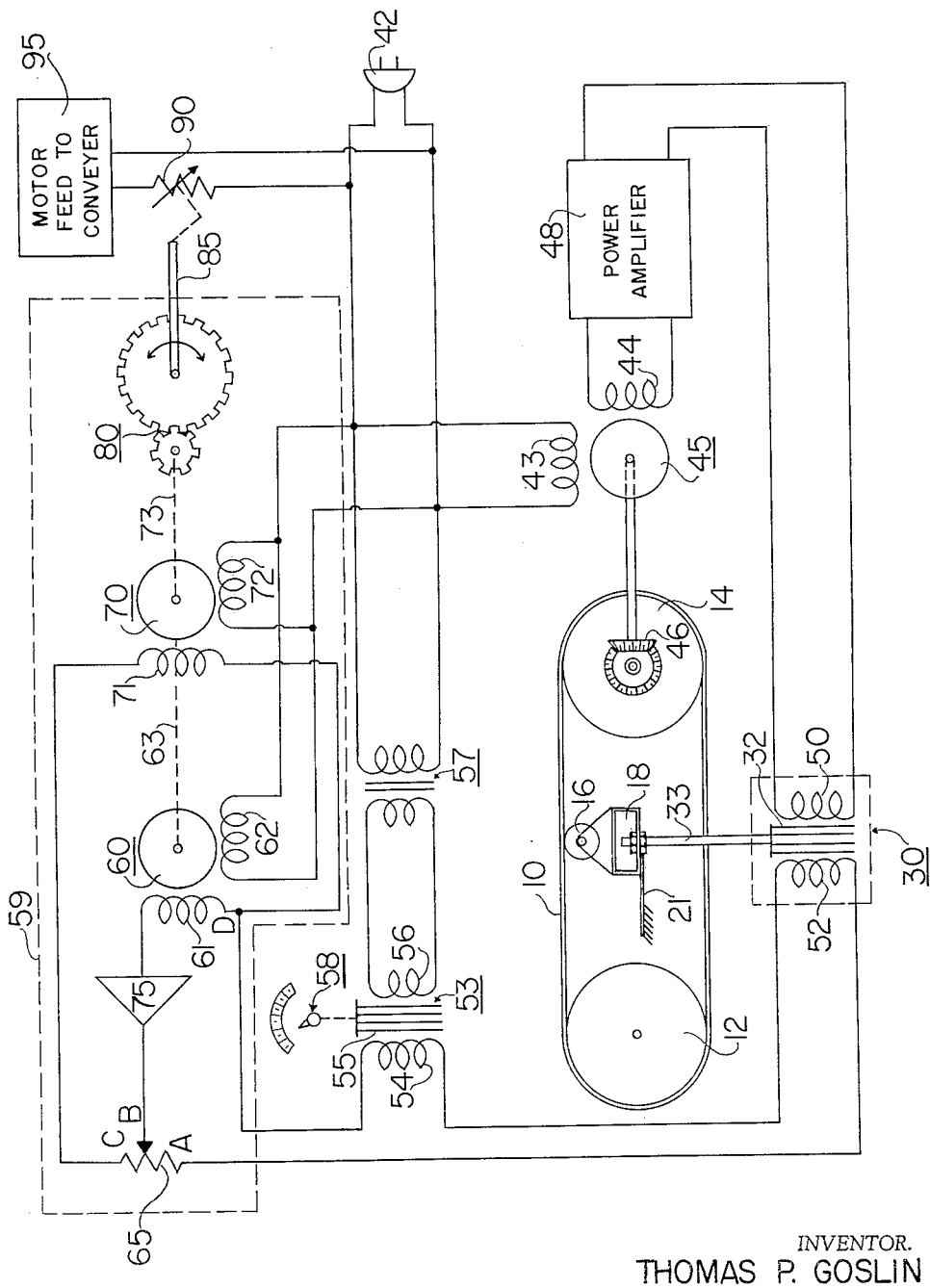
INVENTOR.
THOMAS P. GOSLIN
BY
Bean, Brooks, Buckley & Bean
ATTORNEYS United States Patent Office 2,990,937
Patented July 4, 1961

2,990,937
SERVO CONTROL SYSTEMS
Thomas P. Goslin, Pittsford, N.Y., assignor, by mesne assignments, to Streeter-Amet Company, Grayslake, Ill., a corporation of Illinois
Filed Jan. 12, 1959, Ser. No. 786,126
2 Claims. (Cl. 198—39)

This invention relates to servo control systems, and more particularly relates to such systems including in combination with means for measuring a controllable variable apparatus comprising an integrating means connected with the measuring means to continuously integrate the variable being measured and to provide an output error signal which in turn is employed to operate a controller connected to correct the rate of the variable to compensate for the amount of error.

It is a principal object of the invention to provide a control system including the combination of a controller and a servomechanism having a motor driving an output shaft, the speed and direction of rotation of which is determined by the amplitude of an input signal from said measuring means, and said system integrating and continuously providing an output shaft drive employed to actuate said controller in accordance with the information carried by said input signal.

The present invention is described with reference to a specific use of the system which is intended to illustrate the invention without limiting its scope, the system being installed at a conventional belt-type conveyor similar to the installation disclosed in co-pending patent application Serial No. 598,304 filed July 17, 1956, now Patent No. 2,954,969, and entitled "Weighing Conveyors." The present novel system measures the instantaneous weights of bulk material passing a certain point on the conveyor belt, measures the instantaneous rate of travel of the belt, and then integrates these values of weight and rate and provides mechanical positioning of the aforementioned output shaft coupled to said controller to adjust the rate at which material is delivered to said conveyor belt.

The rate of travel of the conveyor belt in this embodiment is measured by a tachometer generator connected to some moving part of the conveyor system, such as to one of the rollers by which the belt is driven. The tachometer generator is excited from the power lines and provides an output voltage which is proportional to the speed of the belt. This voltage is amplified and is conducted through the primary and secondary windings of a differential transformer to the integrating means. This transformer has a movable core section which is supported below the upper run of the conveyor belt by suitable spring means, whereby the mutual coupling in the transformer is made proportional to the deflection of the belt by the weight of the bulk material being carried thereon. Thus, the output of the transformer is made to represent the product of the belt's speed times the weight of the material on the conveyor belt at the point at which such weighing takes place. A reference signal is introduced in series with the weight-rate output of the measuring transformer and this signal is substantially constant, but can be adjusted to determine the operating point of the system. Whenever the weight rate signal varies with respect to the reference signal, an error signal results and this signal is transmitted to the servomechanism.

This servomechanism has an output shaft the direction and amount of rotation of which is proportional to the error signal which represents deviations in the product of the belt deflection and the belt speed, the total angular displacement of the servomechanism shaft being proportional to the integral of this deviation in the rate at which the material is transported by the belt conveyor. A controller is connected to the output shaft, and in the present illustrative embodiment is represented schematically by a potentiometer connected in series with the power leads to a motor to vary its rate of rotation. This motor controls the rate of bulk material feed to the conveyor as, for instance, by actuating a vibrating pan type material feeder.

It is a very important object of the invention to provide a system for automatically maintaining a selected operative point while at the same time providing a system which will be free of hunting in the vicinity of said operating point despite an appreciable time delay between the point of control and the point of measurement of the effectiveness of that automatic control, i.e. during integration.

Another important object of the invention is to provide a system having a self-compensating tendency, which greatly reduces or eliminates the effect of line voltage fluctuations on the accuracy of control, the servo system employing negative-feedback by which spurious fluctuations are substantially cancelled.

A further object of the invention is to provide a control system which may be conveniently located remotely from the apparatus being monitored and controlled, since it is connected thereto only by a minimum of wiring and does not require mechanical connections thereto.

Other objects and advantages of the invention will become apparent during the following discussion of the drawing which is a schematic diagram showing the novel servo control system associated with a conveyor belt and weight-rate sensing means, the system controlling the position of a control potentiometer which determines the speed of a feed motor, which operates any known type of material feed mechanism (not shown).

Referring now to the drawing, by way of example there is illustrated a belt conveyor including an endless belt 10 which runs on end rollers 12 and 14, at least one of which rollers is driven in any suitable manner (not shown). The load-carrying run of the belt 10 passes over a roller 16 which is supported on a frame 18 which is held against displacement longitudinally of the belt, but which frame is free to move vertically up and down with respect to a stationary supporting bed (not shown). The manner in which this vertically movable frame 18 is supported against horizontal displacements is not shown since it is not important to the present invention, but a leaf spring 21 is provided to urge the roller 16 upwardly into contact with the belt 10. This leaf spring 21 may be replaced by any other suitable spring means such as a coil spring or a torsion bar system, but in any event the spring means 21 should provide a constant modulus of elasticity and a low temperature coefficient.

A transformer 30 is supported on suitable means (not shown) below the frame 18, and includes a movable core section 32 vertically reciprocable in the transformer and connected with a stem 33 which is attached at its upper end to the frame 18, whereby when the roller 16 is deflected up and down on the spring means 21, the stem 33 and movable core section 32 are reciprocated within the transformer 30 so as to vary the magnetic coupling between the primary winding 50 and the secondary winding 52. A tachometer generator 45 is coupled through suitable gearing 46 to a moving member of the belt conveyor, such as the roller 14, the generator 45 including two windings 43 and 44. The winding 43 is connected with an external power line (such as 115 volts 60 cycles) by a suitable plug 42 to energize the tachometer winding 43. Thus, the generator is excited by a power line voltage and generates in the winding 44 an output amplitude of which is proportional to its rotation rate in a well-known manner, and hence proportional to the speed of the endless belt conveyor. The tachometer generator output voltage is amplified electrically by an amplifier 48 to obtain sufficient power to properly excite the primary winding 50 of the variable transformer 30.

The secondary winding 52 of the transformer produces an output voltage which is proportional to the input to the primary winding 50 as modified by positional changes of the movable core 32, which positional changes depend directly upon the instantaneous weights of the material being carried by the belt 10. It should thus be apparent that the output of the secondary winding 52 is a function of both the speed of the belt and of the instantaneous weights carried thereby.

The output of the secondary winding 52 is connected in series with a reference voltage derived across the secondary winding 54 of a variable transformer 53 having a movable core 55 and a primary winding 56 energized from the power line at the plug 42 through a step-down transformer 57. The variable transformer 53 can be of any desired type although in the illustrated embodiment it is of a type similar to the weight-rate transformer 30. The position of the core 55 in the transformer 53 is manually adjusted by a calibrated set-point control 58 whereby the magnitude of the said reference voltage is adjusted.

As stated above the windings 52 and 54 are connected in series and the composite voltage of this series circuit, when not equal to zero, represents an error signal the magnitude of which represents the magnitude of the error and the phase of which represents the direction of the error. The set-point control 58 serves the function of allowing an operator to set a desired operating point for the control system. Deviations in the weight-rate from this operating point result in output voltages from the transformer winding 52 which deviate from the reference voltage at the transformer winding 54 and cause the appearance of said error signal.

This error signal is conducted to the input A of an integrating servomechanism 59 enclosed by a dashed-line box bearing this reference character.

The servomechanism includes a motor 60 having windings 61 and 62, and a generator 70 having windings 71 and 72. The shafts of the motor and of the generator are generally indicated by the dashed lines bearing the reference numerals 63 and 73, and these shafts are coupled together mechanically for unitary rotation. These shafts also are connected through a suitable gear reducer 80 to an output shaft 85.

One motor winding 62 and one generator winding 72 are connected together in parallel, and in turn are excited by the power line, schematically represented by the plug 42. The servomechanism 59 also includes an input network 65 comprising a potentiometer having end terminals A and C, and having an adjustable wiper terminal B. The output at the wiper terminal B is conducted to the amplifier 75.

The input error signal to the integrating servomechanism 59 from the series-connected secondary windings 52 and 54 is applied between terminal D and terminal A of the potentiometer 65 and this error signal is continuously integrated and the output shaft 85 rotated in one direction or the other to rotate a controller which is schematically represented in the illustrated embodiment by a potentiometer 90.

The other potentiometer 65 comprises a difference network to which is applied at point A the error signal to be integrated, and to which is applied at point C a feedback signal from the winding 71 of the generator 70, which latter signal represents the actual rate of rotation of the motor 60. When the wiper arm B is correctly positioned, the output at B of the potentiometer 65 represents the mathematical difference between the input signal to be integrated and the output signal of the generator 70, and this difference signal is actually proportional to the mathematical difference between the error signal input at A and the velocity of the motor 60. The gain of the amplifier 75 is adjusted so as to compensate for the effects of friction and other losses in the instrument motor 60 and in the generator 70. The compensated output signal at B is thus applied to the motor 60 and serves as a control of the speed and direction of this motor so as to make the output shaft 85 move in a direction resulting in the reduction toward zero of the input error signal.

The potentiometer 90 is shown in series with the leads from a feed motor 95 to the source of power schematically represented by the plug 42. The position of the potentiometer determines the speed of rotation of this feed motor and thereby determines the rate of material feed to the conveyor belt 10.

Once the gear ratio at 80 and the circuit constants are selected, the time required for the controller 90 to come to the correct operating point becomes substantially a constant regardless of error amplitude. Thus by selecting this constant close or equal to the time constant of the system, that is, the time required for an input change to be sensed, an instable system is precluded.

I do not limit my invention to the exact embodiment shown in the drawing, for variations in the system and in its application to different types of apparatus can be made within the scope of the following claims.

I claim:

1. A servo control system for use with a conveyor having a weigher and having a material-feed means including a movable rate controller, comprising a source of power, tachometer means on said conveyor and excited by said power and delivering a current proportional to the rate of travel of the materials on the conveyor, current translating means linked to said weigher and varied thereby to deliver a signal which varies both with the rate of travel of the materials and with their instantaneous weights, a source of reference signal excited by said source of power and connected with said current translating means and producing with the signal therefrom an error signal proportional to the difference between that signal and the reference signal, an electric motor having a shaft and having at least two windings, a generator having a shaft coupled for rotation with the motor shaft and having at least two generator windings, one motor winding and one generator winding being excited from said source of power, transmission means connected with said shafts and with said controller for displacement thereof, and a difference network connected to receive said error signal and connected to another generator winding to receive the output therefrom and subtract it from said error signal to produce a difference signal, and an amplifier connected to said network and applying the difference signal after amplification to another motor winding.

2. In a system as set forth in claim 1, said difference network comprising a potentiometer having a wiper contact connected to said amplifier, and having one end of the potentiometer connected to the said another generator winding and the other end of the potentiometer connected to receive said error signal.

References Cited in the file of this patent

UNITED STATES PATENTS

| 1,125,704 | Messiter | Jan. 19, 1915 |
|---|---|---|
| 1,125,705 | Messiter | Jan. 19, 1915 |
| 2,429,651 | Tarr | Oct. 28, 1947 |
| 2,871,436 | Rafferty | Jan. 27, 1959 |
| 2,873,418 | Owen | Feb. 10, 1959 |